United States Patent
Tanaka et al.

[11] Patent Number: 5,877,828
[45] Date of Patent: Mar. 2, 1999

[54] SUBSTRATE FOR LIQUID CRYSTAL DISPLAY ELEMENT AND METHOD FOR MANUFACTURING LIQUID CRYSTAL DISPLAY ELEMENT USING THE SUBSTRATE

[75] Inventors: Takao Tanaka; Yoshifumi Masumoto; Hiroshi Watanabe, all of Fukushima-ken, Japan

[73] Assignee: Alps Electric Co., Ltd., Tokyo, Japan

[21] Appl. No.: 870,041

[22] Filed: Jun. 5, 1997

[30] Foreign Application Priority Data

Jun. 13, 1996 [JP] Japan ................................. 8-152291

[51] Int. Cl.$^6$ .................. G02F 1/1333; G02F 1/1345; G02F 1/13
[52] U.S. Cl. .......................... 349/54; 349/152; 349/187
[58] Field of Search ............................ 349/54, 139, 149, 349/152, 143, 187

[56] References Cited

U.S. PATENT DOCUMENTS

| | | | |
|---|---|---|---|
| 5,327,267 | 7/1994 | Aoki et al. | 359/59 |
| 5,598,283 | 1/1997 | Fujii et al. | 349/152 |
| 5,677,712 | 10/1997 | Murahashi | 349/149 |

FOREIGN PATENT DOCUMENTS 5-333374  12/1993  Japan .......................... 349/54

Primary Examiner—William L. Sikes
Assistant Examiner—Tiep H. Nguyen
Attorney, Agent, or Firm—Brinks Hofer Gilson & Lione

[57] ABSTRACT

A liquid crystal display device includes transparent electrodes mutually extending in parallel, and lead patterns used as terminals leading from ends of the transparent electrodes, both formed on a cell substrate produced by separating a large glass substrate. In the device, extension patterns leading from other ends of the transparent electrodes are formed on the cell substrate, and minute gaps for discharging static electricity accumulated in the transparent electrodes during a production process are formed at portions of the extension patterns outside an effective display region. The liquid crystal display device is produced such that transparent electrodes, lead patterns used as terminals leading from ends of the transparent electrodes, extension patterns leading from the other ends of the transparent electrodes, and an identical potential pattern outside the cell substrate-formed patterns being conductive with the transparent electrodes are formed with a plurality of cell substrate-formed regions being adjacently positioned, minute gaps narrower than the gap between the adjacent transparent electrodes are formed within each cell substrate-formed region outside an effective display region, and the large glass substrate is cut so that a plurality of cell substrates are separately formed.

4 Claims, 2 Drawing Sheets

PRIOR ART

SUBSTRATE FOR LIQUID CRYSTAL DISPLAY ELEMENT AND METHOD FOR MANUFACTURING LIQUID CRYSTAL DISPLAY ELEMENT USING THE SUBSTRATE

BACKGROUND OF THE INVENTION

1. Field of the Invention

The present invention relates to a liquid crystal display device formed so that electrostatic destruction of each transparent electrode can be prevented and quality inspection of the device can be performed with a pattern checker, and a method for producing the liquid crystal display device.

2. Description of the Related Art

In general, a plurality of cell substrates for a liquid crystal display device are simultaneously, separately formed by cutting a large glass substrate provided with transparent electrodes, an orientation film, and so forth. If a large amount of static electricity accumulates when the cell substrates are rubbed during an orientation process, discharge occurs between adjacent transparent electrodes, which may result in inferior display due to damage to both the transparent electrodes and the orientation films by arc heat. Accordingly, when the cell electrodes are produced, prevention of electrostatic destruction is widely employed, in which the static electricity accumulated in the transparent electrodes can be removed to an identical potential pattern conductive to the transparent electrodes via lead patterns, which is previously formed outside a cell substrate-formed region on the large glass substrate.

However, when such an identical potential pattern is completely conductive to the transparent electrodes, each transparent electrode on the large glass substrate cannot be electrically independent. Thus, before a cutting process, it is not possible to perform quality inspection to verify whether or not short-circuiting or disconnection occurs by bringing a pattern checker in contact with each transparent electrode.

Accordingly, as shown in FIG. 3, there is a known conventional technique to provide minute gaps 3a of several microns for discharging static electricity at extensions from lead patterns 3 which are extended from a cell substrate-formed region S so as to be connected to an identical potential pattern 4 and are used as terminals leading from transparent electrodes 2 corresponding to each cell substrate. In other words, by providing the minute gaps 3a, which are also called "arresters", static electricity accumulated in the transparent electrodes 2 during the production process can be discharged through the minute gaps 3a. Thus, discharge between adjacent transparent electrodes 2 hardly occurs. In addition, each transparent electrode 2 is electrically, mutually independent by the provision of the minute gaps 3a. Therefore, convenience of quality inspection is improved because quality inspection with the pattern checker can be performed before the cutting process of the large glass substrate 1.

As described above, in order to provide the minute gap 3a in the lead pattern 3, inevitably, the lead patterns 3 must be extended outward from each cell substrate-formed region so as to be connected to the identical potential pattern 4, and the minute gap 3a must be formed at the extended portions. Thus, as shown in FIG. 3, a predetermined space needs to be reserved between adjacent different cell substrate-formed regions S. Consequently, according to the related art, a high density layout in which a large number of cell substrate-formed regions S are formed is not realized. This reduces the number of cell substrates which are separately obtained from one large glass substrate 1, which hinders productivity improvement and cost reduction.

SUMMARY OF THE INVENTION

Accordingly, it is an object of the present invention to provide a liquid display device and a method for producing the same, in which minute gaps for discharging static electricity are formed at portions (outside an effective display region) of extension patterns leading from transparent electrodes separate from lead patterns, thereby, prevention of electrostatic destruction and quality inspection with a pattern checker can be performed without difficulty even if a high density layout of a plurality of cell substrate-formed regions arranged on a large glass substrate is used in a production phase, and a large number of cell substrates can be separately formed from one large glass substrate.

To this end, according to an aspect of the present invention, the foregoing object has been achieved through the provision of a liquid crystal display device in which transparent electrodes mutually extending in parallel, and lead patterns used as terminals leading from ends of the transparent electrodes are formed on a cell substrate produced by separating a large glass substrate, wherein extension patterns leading from other ends of the transparent electrodes are formed on the cell substrate, and minute gaps for discharging static electricity accumulated in the transparent electrodes during a production process are formed at portions of the extension patterns outside an effective display region.

Preferably, the minute gap is narrower than the gap between the adjacent transparent electrodes.

The minute gaps may be overlaid with sealing agents.

According to another aspect of the present invention, the foregoing object has been achieved through the provision of a method for producing a liquid crystal display device, comprising the steps of: providing on a large glass substrate capable of being separated to form a plurality of cell substrates, transparent electrodes mutually extending in parallel in each cell substrate-formed region, lead patterns used as terminals leading from ends of the transparent electrodes, extension patterns leading from other ends of the transparent electrodes, and an identical potential pattern outside the cell substrate-formed regions being conductive with the transparent electrodes via the lead patterns or the extension patterns, with the different cell substrate-formed regions being adjacently positioned; connecting the lead patterns in one cell substrate-formed region and the extension patterns in another cell substrate-formed region where the cell substrate-formed regions are adjacently positioned; providing minute gaps for discharging static electricity accumulated in the transparent electrodes during a production process at portions of the extension patterns within one cell substrate-formed region outside an effective display region; and cutting the large glass substrate into a plurality of separate cell substrates.

According to the present invention, even if a liquid crystal display device employs a high density layout in which cell substrate-formed regions are formed on a large glass, prevention of electrostatic destruction and quality inspection with a pattern checker can be performed without difficulty because extension patterns in each cell substrate-formed region are provided with minute gaps. In addition, even when discharge of static electricity occurs in the minute gaps in a production process, display quality cannot be affected at all because the extension patterns outside an effective display region are damaged by arc heat.

Moreover, by using a layout in which a plurality of cell substrate-formed regions are arranged at high density on the large glass substrate, a large number of cell substrates can be separately formed, which realizes both productivity improvement and cost reduction.

DESCRIPTION OF THE PREFERRED EMBODIMENT

Figure 1:
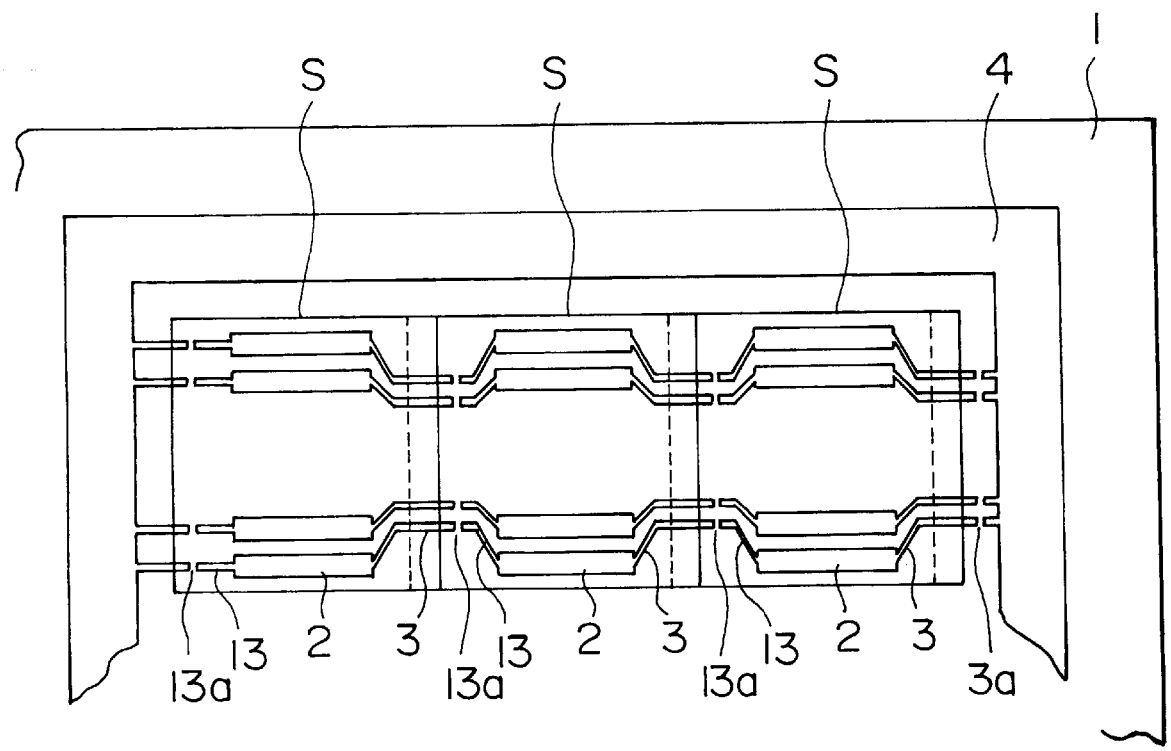
FIG. 1 is a plan view showing a layout (formed before a cutting process) of a cell substrate for a liquid crystal display device according to an embodiment of the present invention.
Figure 2:
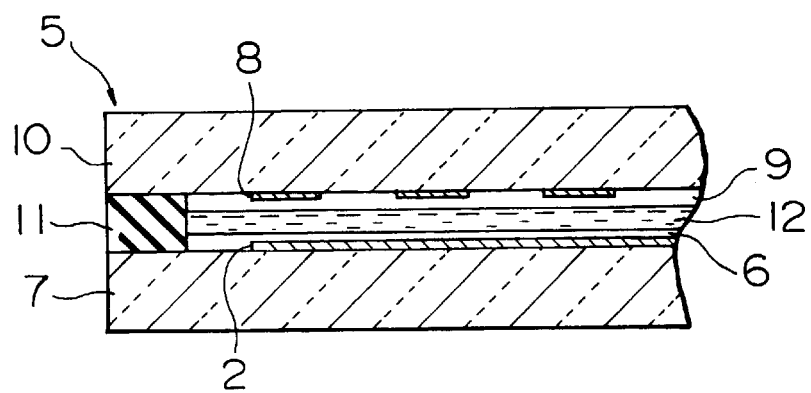
FIG. 2 is a schematic sectional view showing a completed liquid crystal display device according to the embodiment of the present invention.
Figure 3:
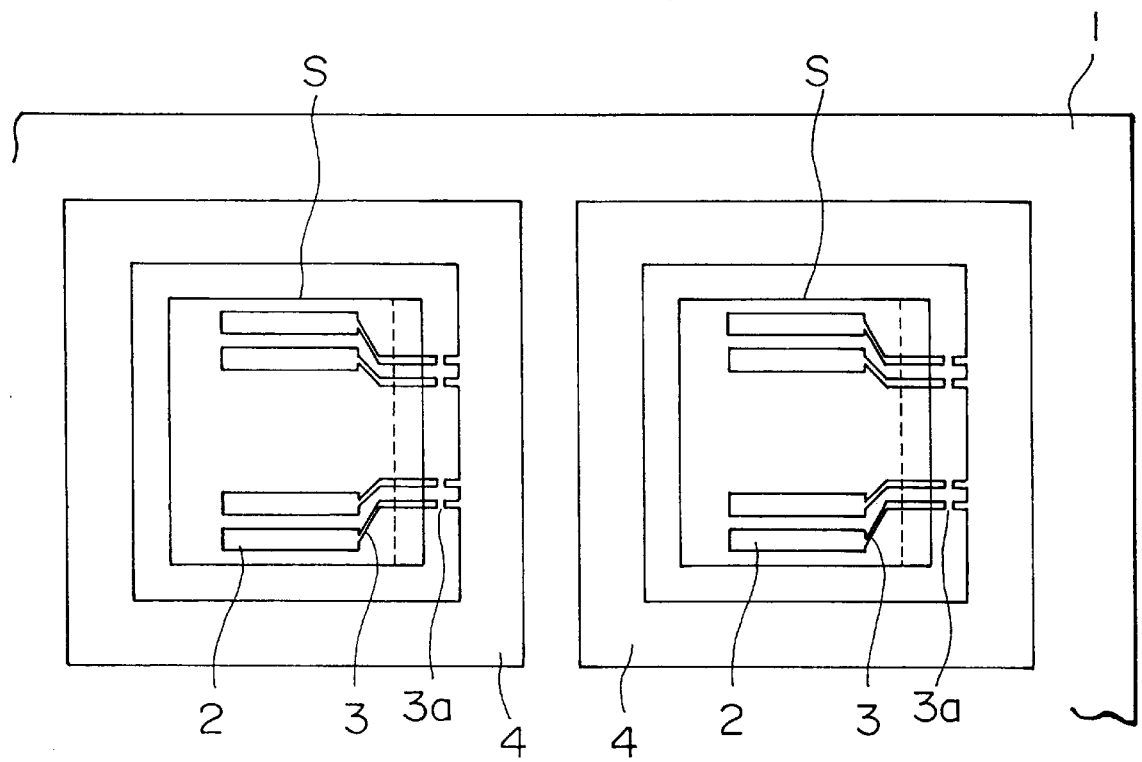
FIG. 3 is a plan view showing a layout (formed before a cutting process) of a cell substrate for a conventional liquid crystal display device.

Referring to the attached drawings, FIG. 1 shows a plan view illustrating a layout (formed before a cutting process) of a cell substrate for a liquid crystal display device according to an embodiment of the present invention, and FIG. 2 shows a schematic sectional view illustrating a completed liquid crystal display device according to the present invention. Components corresponding to those shown in FIG. 3 illustrating the related art are denoted by identical reference numerals.

A liquid crystal display device 5 shown in FIG. 2 is formed such that a cell substrate 7 including a transparent electrode (common electrode) 2 and an orientation film 6, and a cell substrate 10 including transparent electrodes (segment electrodes) 8 and an orientation film 9 are stacked with a frame-shaped coat of sealing agent 11 provided therebetween so that their electrode-formed surfaces are opposed, and liquid crystal 12 is subsequently encapsulated in a space sealed by both cell substrates 7, 11 and the sealing agent 11.

As is generally known, both cell substrates 7 and 10 of the liquid crystal display device 5 are separately formed by cutting a large glass substrate with transparent electrodes and an orientation film formed thereon and an orientation process performed. In this embodiment, by using a layout for dense cell substrate-formed regions on the large glass substrate, a large number of cell substrates can separately be formed from one large glass substrate.

For example, concerning one cell substrate 7, a large number of cell substrates are simultaneously, separately formed as follows:

As shown in FIG. 1, transparent electrodes 2 extending mutually in parallel within each cell substrate-formed region S, lead patterns 3 used as terminals leading from ends of the transparent substrates 2, extension patterns 13 leading from other ends of the transparent substrates 2, and an identical potential pattern 4 positioned outside the cell substrate-formed region S which is conductive to the transparent electrodes 2 via the lead patterns 3 and the extension patterns 13, are initially formed on the large glass substrate 1 so that different cell substrate-formed regions S are adjacently positioned. At the same time, at portions where the cell substrate-formed regions S are adjacently positioned, the lead patterns 3 in one region S and extension patterns 13 in another region S are connected. Subsequently, at portions of the respective extension patterns 13 which overlap with a region coated with the sealing agent 11 in proximity to the periphery of the region S within the cell substrate-formed region S, or definitely at portions positioned 0.9 mm inside of the periphery of the region S, minute gaps 13a for discharging static electricity accumulated in the transparent substrate 2 during a production process are formed.

In addition, in order to arrange a plurality of cell substrate-formed regions S in the form of continuous columns, as shown in FIG. 1, it is preferable to use a layout in which the lead patterns 3 extend from the cell substrate-formed region S positioned at one end of a column to connect to the identical potential pattern 4. Thus, at extensions of the lead patterns 3 which are connected to the identical potential pattern 4, the minute gaps 3a are formed similar to the related art.

FIG. 1 shows a condition obtained after forming the minute gaps 13a and the minute gaps 3a. Accordingly, each transparent electrode 2 is electrically, mutually independent, and is free from conduction to the identical potential pattern 4. Each of the minute gaps 13a and the minute gaps 3a is set to 6 microns, which is narrower than the gap between adjacent transparent electrodes 2.

By providing a minute gap 13a at the predetermined portion of each lead pattern 13, even if a liquid crystal display device employs an area-efficient layout in which a plurality of cell substrate-formed regions S are continuously formed on one large glass substrate 1, or a high density layout in which different cell substrate-formed regions S are adjacently positioned, electrostatic destruction of transparent electrode 2 can be prevented because static electricity accumulated in the transparent electrode 2 can be discharged through the minute gap 13a during a rubbing orientation process or the like. In addition, by providing minute gaps 13a, each transparent electrode 2 on the large glass substrate 2 can be electrically independent. Thus, before a cutting process, it is possible to perform quality inspection by bringing a pattern checker in contact with the liquid crystal display device in order to verify whether or not short-circuiting or disconnection occurs.

After quality inspection of each transparent electrode 2 has been finished, the large glass substrate 1 is cut along predetermined lines to form separate cell substrates 7. As described above, a plurality of cell substrate-formed regions S are arranged at high density on the large glass substrate 1. Thus, according to this embodiment, a large number of cell substrates 7 can be simultaneously, separately formed from one large glass substrate 1. As a result, productivity of liquid crystal display devices 5 increases to reduce a production cost.

If electrostatic discharging occurs at the minute gap 13a in the production process, the extension pattern 13 is damaged by arc heat. But, a portion where such damage supposedly occurs is in the vicinity of the minute gap 13a, on which the sealing agent is stacked, or is outside the effective display region of the cell substrate 7, which thus does not deteriorate display quality even if static electricity is discharged.

In the foregoing embodiment, only a method for producing one cell substrate 7 for the liquid crystal display device 5 has been described, but it need hardly be said that also another cell substrate 10 can be efficiently produced at a low cost in the same manner.

What is claimed is:

1. A liquid crystal display device in which transparent electrodes mutually extending in parallel, and lead patterns used as terminals leading from ends of said transparent electrodes are formed on a cell substrate produced by separating a glass substrate, said liquid crystal display device comprising:
- a glass substrate comprising:
  - a plurality of cell substrates, wherein each of said plurality of cell substrates comprises:
    - a group of transparent electrodes extending in parallel to each other;
    - a group of lead patterns fed out of a first end of each group of transparent electrodes, wherein each of said lead patterns comprises a terminal end, and;
    - a group of extension patterns fed out of a second end of said group of transparent electrodes, wherein each of said extension patterns comprises a terminal end, and wherein the terminal ends of said group of lead patterns and the terminal ends of said group of extension patterns are opposite to each other; and
- electrostatic discharging patterns at outer circumferences of said plurality of cell substrates and at least one of said group of lead patterns or said group of extension patterns is separated from one of said electrostatic discharging pattern by a minute gap located outside an effective display region and for discharging static electricity accumulated in said group of transparent electrodes during a production process.

2. A liquid crystal display device according to claim 1, wherein each of said minute gaps has a width of approximately several microns and is narrower than a gap formed between adjacent transparent electrodes.

3. A liquid crystal display device according to claim 1, wherein said minute gaps are overlaid with sealing agents.

4. A method for producing a liquid crystal display device, comprising the steps of:
- providing on a large glass substrate capable of being separated to form a plurality of cell substrates, transparent electrodes mutually extending in parallel in each cell substrate-formed region, lead patterns used as terminals leading from ends of said transparent electrodes, extension patterns leading from other ends of said transparent electrodes, and an electrostatic discharging pattern outside said cell substrate-formed regions being conductive with said transparent electrodes via said lead patterns or said extension patterns, with said different cell substrate-formed regions being adjacently positioned;
- connecting said lead patterns in one cell substrate-formed region to said extension patterns in an adjacently positioned cell substrate-formed region;
- providing minute gaps for discharging static electricity accumulated in said transparent electrodes during a production process at portion of said extension patterns within one cell substrate-formed region outside an effective display region; and
- cutting said large glass substrate so that a plurality of cell substrates are formed.

* * * * *

UNITED STATES PATENT AND TRADEMARK OFFICE
CERTIFICATE OF CORRECTION

PATENT NO. : 5,877,828
DATED : March 2, 1999
INVENTOR(S) : Takao Tanaka et al.

It is certified that error appears in the above-identified patent and that said Letters Patent is hereby corrected as shown below:

<u>In the Claims</u>

Claim 3 should be deleted in its entirety.

In claim 4, line 1, replace "4" with --3--.

Signed and Sealed this

Twentieth Day of July, 1999

Attest:

Q. TODD DICKINSON

Attesting Officer     Acting Commissioner of Patents and Trademarks